May 28, 1935. A. J. HARTLEY 2,002,943
CLUTCH
Filed Dec. 10, 1930
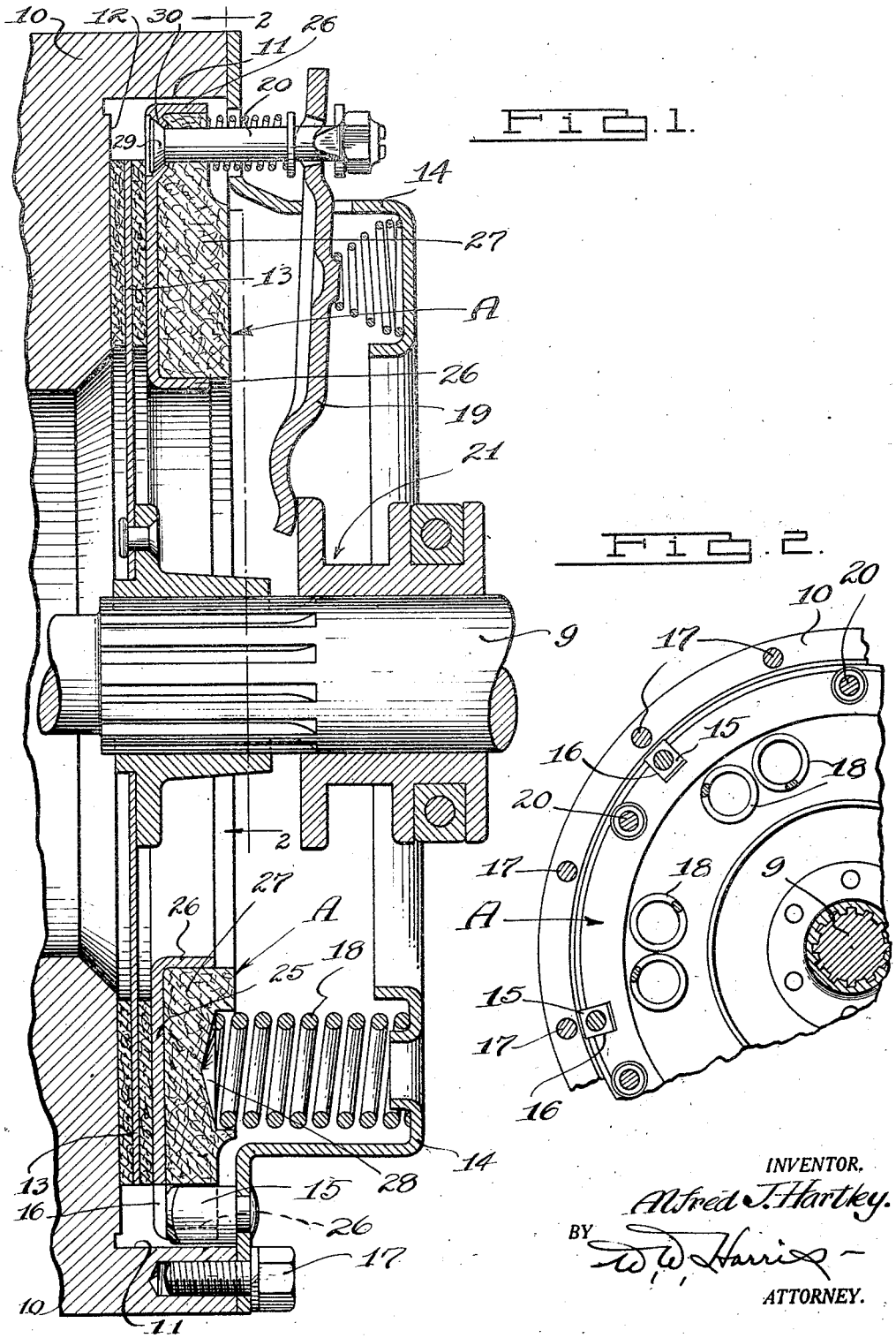
INVENTOR.
Alfred J. Hartley.
BY
ATTORNEY.

Patented May 28, 1935

2,002,943

UNITED STATES PATENT OFFICE 2,002,943

CLUTCH

Alfred J. Hartley, Detroit, Mich., assignor to Continental Motors Corporation, Detroit, Mich., a corporation of Virginia Application December 10, 1930, Serial No. 501,338

9 Claims. (Cl. 192—68)

My invention relates to clutches and more particularly pertains to an improved clutch driving means or pressure plate especially adapted for use with clutches employed in automobiles or other like vehicles.

It is an object of my present invention to provide an improved pressure plate for clutches or like devices that may be more economically manufactured.

A further object of my invention is to facilitate the efficient operation of a clutch adapted for use with automobiles or other like vehicles by providing an improved pressure plate assembly of greater strength and wearing qualities constructed of an economically constructed member of steel or other material of a like character adapted to provide a wearing face for engagement with the driven means or clutch disc, said steel member having a backing of heat resisting material secured thereto.

For a more detailed understanding of my invention, reference may be had to the accompanying drawing which illustrates one form which my invention may assume, and in which:

Figure 1 is a longitudinal sectional view through a clutch device constructed in accordance with my invention, and Figure 2 is a fragmentary sectional view taken on the line 2—2 of Figure 1.

In general, a clutch comprising driving and driven means respectively adapted for driving connection with driving and driven members 10 and 9 respectively. The driving member usually employed with clutches used in automobiles or other like vehicles is the engine flywheel 10 which is recessed as at 11 and provided with a machined face 12 adapted for engagement with the driven means or clutch disc 13. The driving means or pressure plate assembly A is connected with the flywheel 10 by the cover plate 14, said cover plate carrying driving lugs or elements 15 adapted for engagement with slots 16 in the pressure plate assembly. The cover plate is fastened to the flywheel by bolts or other fastening devices 17. Springs or other yieldable means 18 act on the pressure plate assembly to engage the same with the clutch disc to effect a clutching engagement between the driving and driven means. Lever means 19 fulcrumed on the cover plate 14 in the usual manner, engage pins 20 carried by the pressure plate assembly and are actuated by a clutch releasing means 21 to retract the pressure plate assembly for releasing the same from clutching engagement with the driven means or clutch disc.

My improvement lies in the construction of the clutch driving means or pressure plate assembly. One embodiment of my invention illustrated in the accompanying drawing provides a built up pressure plate structure consisting of a sheet metal shell structure 25 that is preferably constructed of an annular channel shaped member, the bottom or inner face of said member providing a substantially flat wearing face adapted for engagement with the clutch disc or driven means of the clutch assembly. Said channel member provides the radially spaced inner and outer annular flanges 26 extending rearwardly and this member is preferably provided with a rigid backing 27 of heat resisting material, such as wood, rubber, fibre, Bakelite or other similar materials, which is preferably constructed of an annular ring adapted to fit into the annular channel. This backing or filler member 27 is provided with one or more recesses 28 in which the springs 18 are adapted to seat. The pins 20 are provided with head portions 29 adapted for engagement in the countersunk portions 30 carried by the sheet metal shell structure 25, said pins extending through holes or openings in the heat resisting filler member 27 and projecting beyond the rear face thereof. The slots 16 in the pressure plate assembly are preferably cut in the shell structure and the filler member as well, and thus both the shell structure and filler member are positively driven by the driving lugs 15. It may be noted that the driving lugs engage the flange portion 26 of the shell structure, thereby providing a maximum bearing surface for the driving connection between the driving lugs and shell structure.

I find that the filler block 27 is very advantageously employed since it effects a distribution of the spring load circumferentially from the springs 18 to the shell structure as well as insulating the springs from the frictional heat developed during the operation of the clutch. However, a sheet metal shell structure reinforced by flanges 26 or other suitable means may be employed as a pressure plate without the backing or filler member 27 if so desired, the steel shell structure, when reinforced to prevent warping, having the necessary strength and wearing qualities found to be essential in a clutch pressure plate.

Thus, it will be noted that I have provided a built up pressure plate structure that may be readily manufactured with a minimum of time and labor, the savings effected by such an economically manufactured product, being of a decided value to the clutch manufacturer.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In a clutch having driving and driven members and driving and driven means respectively connected in driving engagement with said driving and driven members; said driving means comprising a sheet metal member adapted to provide a substantially flat wearing surface for engagement with said driven means, and a backing member consisting of a ring of heat resisting material secured in concentric relation to said sheet metal member and adapted for transmitting the driving effort in conjunction with said sheet metal member.

2. In a clutch having driving and driven members and driving and driven means respectively connected in driving engagement with said driving and driven members; said driving means comprising a sheet metal channel annulus adapted to provide a wearing surface for engagement with said driven means, and a backing member consisting of an annulus of heat resisting material secured concentrically within and substantially filling said sheet metal channel annulus, said sheet metal annulus and associated backing member driven by said driving member.

3. In a clutch having driving and driven members, driving and driven means respectively connected in driving engagement with said driving and driven members, and clutch actuating spring means; said driving means comprising a sheet metal channel annulus adapted to provide a wearing surface for engagement with said driven means, and a backing member constructed of an annulus of heat resisting material concentrically secured within said sheet metal channel annulus and provided with a recess in the rear face adapted for seating said clutch actuating spring means.

4. In a clutch having driving and driven members and driving and driven means respectively connected in driving engagement with said driving and driven members, said driving member having driving lugs; said driving means comprising a sheet metal member adapted to provide a wearing surface for engagement with said driven means, and a backing member constructed of heat resisting material secured to said sheet metal member, said members provided with co-operating slots adapted for engagement with the driving lugs thereby effecting a simultaneous drive of the said members.

5. In a clutch having driving and driven members and driving and driven means respectively connected in driving engagement with said driving and driven members; said driving means comprising a sheet metal channel annulus adapted to provide a wearing surface for engagement with said driven means, and a backing member constructed of an annulus of heat resisting material secured within said sheet metal channel annulus, a pin anchored to said sheet metal annulus and projecting rearwardly of said driving means through the backing member, lever means engaged with said pin, and clutch releasing means engaged with said lever means.

6. A pressure plate assembly for a clutch device constructed of a sheet metal shell structure and a rigid filler of heat resisting material, said shell structure and filler being adapted for transmitting the driving effort.

7. A pressure plate assembly for a clutch device constructed of a sheet steel shell structure and a rigid filler of heat resisting material substantially filling said shell and adapted for transmitting the driving effort in cooperative operation with said steel shell structure.

8. In a clutch having driving and driven members and driving and driven means respectively connected in driving engagement with said driving and driven members, said driving member having driving elements, said driving means comprising a metallic member adapted to provide a wearing surface for engagement with said driven means, an insulating member associated with said metallic member, said metallic member and insulating member being provided with cooperating openings adapted for engagement with said driving elements whereby to simultaneously drive said metallic member and said insulating member.

9. In a clutch having driving and driven members and driving and driven means respectively connected in driving engagement with said driving and driven members; said driving means comprising a sheet metal annulus adapted to provide a substantially flat wearing surface for engagement with said driven means, yielding means loading the sheet metal annulus, and a backing member consisting of an annulus of heat resisting material secured in concentric relation to said sheet metal annulus, said backing member being sufficiently rigid to distribute the load from said yielding means to the sheet metal annulus and for transmitting the driving effort in conjunction with said sheet metal annulus.

ALFRED J. HARTLEY.